(No Model.)
G. T. SAMPSON.
SLED PROPELLER.
No. 312,388. Patented Feb. 17, 1885.
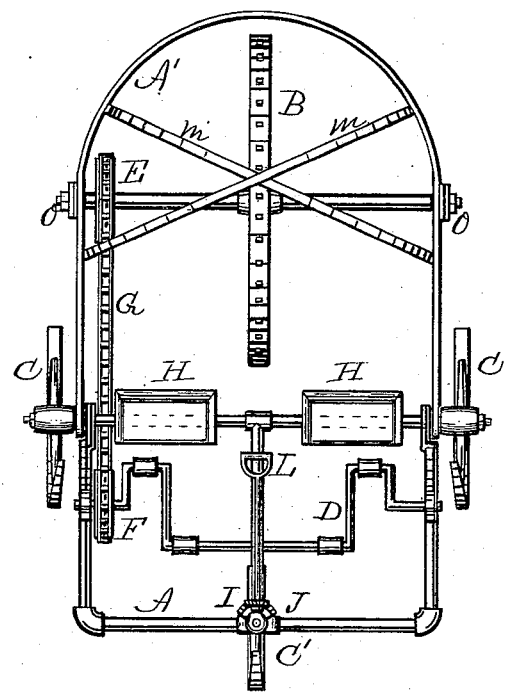
WITNESSES:
Fred Reibold
Leopold Leibold
INVENTOR
George T. Sampson
BY B. Pickering
ATTORNEY

United States Patent Office.

GEORGE T. SAMPSON, OF DAYTON, OHIO.

SLED-PROPELLER.

SPECIFICATION forming part of Letters Patent No. 312,388, dated February 17, 1885.

Application filed January 5, 1885. (No model.)

*To all whom it may concern:*

Be it known that I, GEORGE T. SAMPSON, a citizen of the United States, residing at Dayton, in the county of Montgomery and State of Ohio, have invented a certain new and useful Improvement in a Propeller for Sleds; and I do hereby declare that the following is a full, clear, and exact description of the invention, which will enable others skilled in the art to which it appertains to make and use the same, reference being had to the accompanying drawing, and to the letters of reference marked thereon, which forms a part of this specification.

My invention relates to improvements in a propelling device attached to the frame of a well-known form of tricycle, on the spindles of which runners are substituted for the wheels. To the rear of said frame is pivoted a frame supporting a ground-wheel, which is connected by an endless chain to the pulley on the treadle-shaft. The sled thus formed is propelled by the ground-wheel, whose tire is roughened, that the necessary friction may be had.

The mechanism is illustrated in the accompanying drawing, in which the figure is a top view of the propeller-sled.

A is a known form of tricycle-frame, and to the sides of the frame are attached spindles, to which wheels are ordinarily attached, on which the runners C are attached, these runners being constructed with suitable hubs for such attachment. To the central forward portion of the frame is pivoted the runner C'. This runner is attached to a vertical spindle, and to which is connected the segmental rack J. The pinion I engages this rack, and to which the handle L is attached for convenience in turning the same, and thereby turning the runner, as a means of guiding the sled or sleigh. On the rear part of frame A are attached two seats, H, and a little in front of these, at a lower elevation, are bearings for the crank-shaft D, on which are four pedals for the feet of two persons. To the crank-shaft is attached the lugged pulley F.

The parts thus far described are not novel, and the only peculiarity is attaching runners to the spindles for the wheels of a tricycle-frame.

A' is a frame made of bar-iron. The rear portion is semicircular, and has curved stays *m m* connecting the sides. The ends of the frame have holes which embrace the spindles and upon which they freely move.

B is the ground or driving wheel, which is fixedly attached to its shaft, which shaft is held within bearings O O, riveted to the frame. To this wheel-shaft is attached the lugged pulley E, and this pulley is connected by the endless chain G with the pulley F on the crank-shaft.

The operation is thus: Persons occupying the seats operate the crank-shaft with their feet, which causes the ground-wheel to rotate, and the vehicle is thereby propelled, the direction being given as before indicated.

Having fully described my invention, what I desire to secure by Letters Patent is—

The combination, in a propelling sled or sleigh, substantially as set forth, comprising the ground-wheel B, pulleys E and F, endless chain G, treadle or crank shaft D, and frame A', pivoted to frame A, mounted on runners.

In testimony that I claim the foregoing as my own I affix my signature in presence of two witnesses.

GEORGE T. SAMPSON.

Witnesses:
   B. PICKERING,
   C. A. WALTMIRE.